United States Patent
Ozalevli

(10) Patent No.: US 9,292,038 B1
(45) Date of Patent: Mar. 22, 2016

(54) SYNCHRONIZATION CIRCUIT

(71) Applicant: Texas Instruments Incorporated, Dallas, TX (US)

(72) Inventor: Erhan Ozalevli, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/531,685

(22) Filed: Nov. 3, 2014

(51) Int. Cl.
*G06F 1/04* (2006.01)
*G06F 1/12* (2006.01)

(52) U.S. Cl.
CPC .................................. *G06F 1/12* (2013.01)

(58) Field of Classification Search
None
See application file for complete search history.

(56) References Cited

U.S. PATENT DOCUMENTS

| | | | |
|---|---|---|---|
| 8,570,014 B2* | 10/2013 | Laur | H02M 3/33561 323/283 |
| 8,890,588 B2* | 11/2014 | Shah | G06F 1/04 327/143 |
| 2008/0313487 A1* | 12/2008 | Mochizuki | G06F 1/04 713/601 |
| 2012/0274146 A1* | 11/2012 | Laur | H02M 3/33561 307/82 |
| 2015/0058001 A1* | 2/2015 | Dai | H04R 3/00 704/231 |

* cited by examiner

*Primary Examiner* — Cassandra Cox
(74) *Attorney, Agent, or Firm* — William B. Kempler; Frank D. Cimino

(57) ABSTRACT

A synchronization circuit receives an external clock input. The circuit includes an internal oscillator; a clock detection circuit, coupled to the external clock input, for determining whether a clock signal at the external clock input is valid; circuitry for keeping the frequency of the internal oscillator constant until the clock detection circuit determines that an external clock signal is valid; and circuitry for switching the output of the synchronization circuit from the internal oscillator to the external clock input when the clock detection circuit determines than an external clock signal is valid.

20 Claims, 5 Drawing Sheets

SYNCHRONIZATION CIRCUIT

BACKGROUND

Synchronization circuits are generally used to synchronize the internal clocks of multiple devices within a distributed system. For example, a system may have multiple switching power supplies. In such a system, external frequency synchronization is used to set the power supply switching noise at a frequency where system interference can be avoided. External frequency synchronization is also used to reduce the ripple current, and is also used to eliminate beat frequencies resulting from switching regulators operating at different frequencies.

Switching power supplies may need to operate using an external clock signal when one is available, but may also need to operate using an internal clock when no external clock is available. For example, shortly after power-on, power supplies may be operational before clock circuitry becomes operational, so a switching regulator needs to be able to operate from an internal oscillator until an external clock signal is available. Also, during a standby mode, external clocks may be turned off, but the power supplies may need to maintain standby power. It is common for switching regulators to have a clock terminal (sometimes labeled RT/CLK) and the switching regulators can switch between an external clock and an internal clock depending on the state of the clock terminal. If the RT/CLK terminal is held to a low or high voltage, the switching regulator uses an internal clock generator having a frequency determined by an internal resistor. If the RT/CLK terminal is driven with an external resistor, the switching regulator uses an internal clock generator having a frequency determined by the external resistor. If the RT/CLK terminal is raised to a voltage above a predetermined threshold and driven with an appropriate external clock signal, then the switching regulator synchronizes its internal clock to the external clock signal.

For switching regulators using Pulse-Width-Modulation (PWM), a pulse controls the time during which an inductor is energized within each switch period. Typically, PWM regulators have a closed-loop feedback system. For peak current mode PWM, if the duty cycle of the PWM pulses becomes greater than 50 percent, the closed-loop feedback system may cause the PWM pulses to alternate between two values of duty cycle with an average duty cycle of 50 percent, so there is no convergence to a steady-state pulse width. This is called sub-harmonic oscillation. To prevent sub-harmonic oscillation, it is common to modify the rate-of-change (slope) of the feedback control signal as a function of pulse width and as a function of switching frequency.

FIG. 1 illustrates an example prior art power supply 100. The power supply 100 includes a switching regulator 102 that drives an external inductor 104 and an external capacitor 106. The switching regulator 102 includes a PWM circuit 108 that controls switches 110 and 112. The duty cycle of switch 110 determines the time that the inductor 104 is energized within each switch period. The switching regulator 102 also includes a synchronization circuit 114. The switching regulator 102 also includes a RT/CLK terminal 116, which may be coupled to an external clock signal 118 through a tri-state buffer 120. If there is no external clock signal 118, then the tri-state buffer 120 is in a high-impedance state, and an amplifier 122 drives the voltage at the RT/CLK terminal 116 to a reference voltage $V_{REF}$. The resulting current through an external resistor 124 controls the frequency of a local oscillator 126. If the RT/CLK terminal 116 is forced by the external clock 118, then the tri-state buffer 120 is in a low-impedance state, in which case the amplifier 122 and an electronic switch 128 are turned off, and the frequency of the local oscillator 126 is controlled by a Phase-Locked-Loop (PLL) 130. As a result, the output of the local oscillator 126 is synchronized to the external clock signal 118.

It is common for switching regulators to use a PLL (as illustrated in FIG. 1, 130) as part of a synchronization circuit to synchronize an internal clock to an external clock. In addition, it is common for peak-current-controlled switching regulators to use the frequency information in the form of current to control slope-compensation to prevent sub-harmonic oscillation. For example, the switching regulator 102 also includes a current control signal 132 that is provided to a slope-compensation circuit 134. The current control signal 132 is driven by the PLL 130 and by the electronic switch 128. When either the PLL 130 or the electronic switch 128 stops driving, the other takes over.

A switching regulator may be required to operate over a broad range of switching frequencies (for example, 100 KHz to 3 MHz). PLL's require a relatively large area on an integrated circuit die, and the size and cost of PLL's increase as the required range of frequencies increases. PLL's also require a finite amount of time to stabilize after a transition from internal clock mode to external clock mode and from external clock mode to internal clock mode. This stabilization time can cause a voltage regulator to lose its control over the regulation of its output voltage. There is a need for synchronization circuits with lower cost and smaller die area, while still providing the functions of synchronization to an external clock and extracting frequency information from the clock for use in slope-compensation. In addition, there is a need to minimize perturbations to the internal clock frequency and the slope-compensation control current during a transition from an external clock mode to an internal clock mode and during a transition from an internal clock mode to an external clock mode.

DETAILED DESCRIPTION

Figure 1:
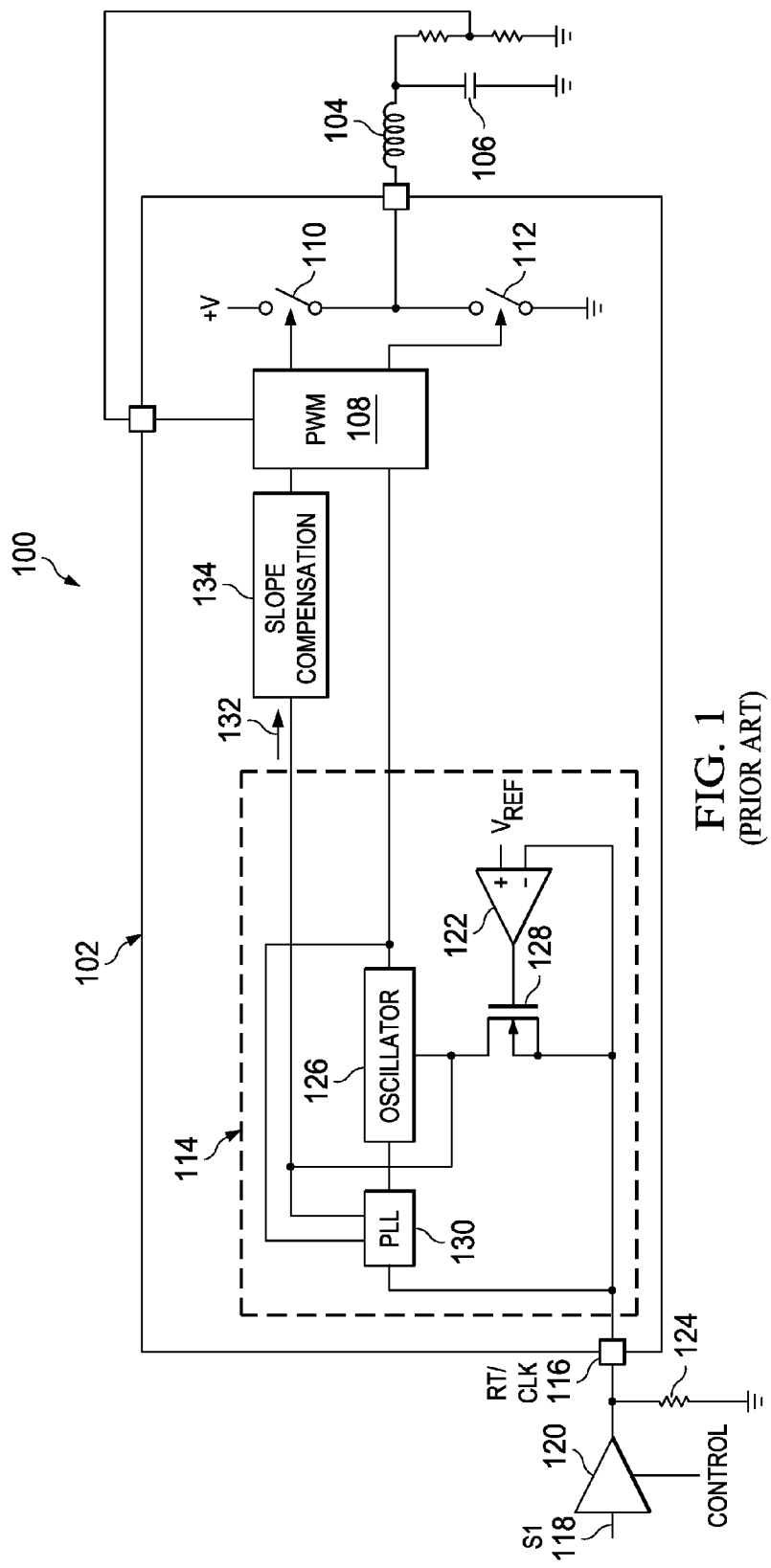
FIG. 1 is a block diagram illustrating an example prior art switching power supply including a prior art synchronization circuit.
Figure 2:
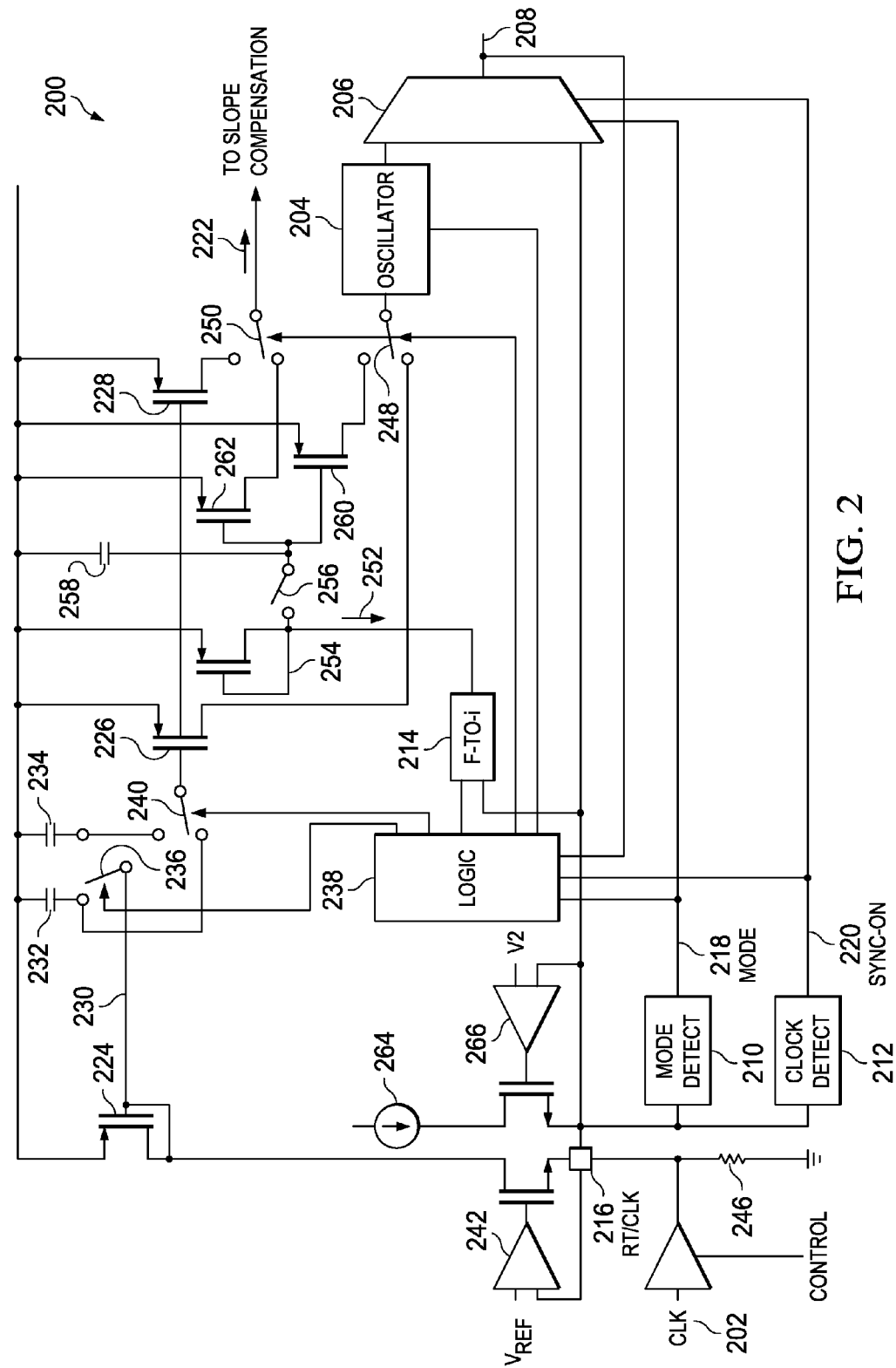
FIG. 2 is a block diagram illustrating an example embodiment of an improved synchronization circuit.

FIG. 2 is a simplified block diagram illustrating an example synchronization circuit 200, which may be part of a switching regulator circuit. For example, synchronization circuit 200 could replace synchronization circuit 114 in the example switching regulator 100 of FIG. 1. Note in particular that the synchronization circuit 200 does not have a PLL, and the advantages of eliminating the PLL will be discussed later. Note also that the example of FIG. 2 includes an optional current output 222 for slope compensation, and therefore it is particularly useful for peak-current-mode control PWM where slope compensation is needed, but the synchronization part of the circuitry is useful for any switching regulator whether slope compensation is needed or not.

The synchronization circuit 200 has an external clock input 202 and an internal oscillator 204. A multiplexer 206 selects between the external clock 202 and the output of the internal oscillator 204 to provide an output clock signal 208. The synchronization circuit 200 includes a mode detection circuit 210, a clock detection circuit 212, and a frequency-to-current converter 214. The synchronization circuit 200 also includes a RT/CLK terminal 216. The mode detection circuit 210 generates a MODE signal 218 having a state that depends on the status of the RT/CLK terminal 216. When there is no external clock signal 202 present, the MODE signal 218 indicates an RT-MODE and the synchronization circuit 200 uses the internal clock signal from the internal oscillator 204. When there is an external clock signal 202 present, the MODE signal 218 indicates a CLK-MODE, and the synchronization circuit 200 uses the external clock signal 202. The clock-detection circuit 212 has an output signal SYNC-ON 220 that indicates when the external clock signal 202 is valid. A current signal output 222 controls an external slope-compensation circuit (for example, circuit 134 in FIG. 1).

It is possible that noise on the RT/CLK terminal 216 can trigger the MODE signal 218. As will be described in more detail below, the synchronization circuit 200 has multiple features that minimize perturbations to the output clock signal 208 and perturbations to the slope-compensation control current 222 when the voltage at the RT/CLK terminal 216 changes. When the RT/CLK terminal 216 changes states, current sources being controlled by the voltage at the RT/CLK terminal 216 are kept constant as a result of double-sampling that keeps track of the current before the state change happens. Similarly, when the MODE signal 218 changes states, either from RT-MODE to CLK-MODE, or from CLK-MODE to RT-MODE, the frequency of the output clock signal 208, and the slope-compensation control current 222, are kept constant by sample-and-hold circuits until the mode of operation is verified.

First, consider voltage changes at the RT/CLK terminal 216. A transistor 224 provides the current through the RT/CLK terminal 216. As will be described in more detail below, the current through the RT/CLK 216 terminal is mirrored by two other current mirrors 226 and 228. The voltage at the gate 230 of transistor 224 (which controls the current through transistor 224) is subject to a transient condition when the voltage at the RT/CLK terminal 216 changes. To prevent a transient voltage at the gate 230 from affecting the current mirrors 226 and 228, the voltage at the gate 230 is sampled and held alternately by two capacitors 232 and 234. An electronic switch 236, controlled by a logic circuit 238, causes capacitors 232 and 234 to sample the voltage at the gate 230 on alternate clock cycles. That is, capacitor 232 samples on one clock cycle, and capacitor 234 on the next clock cycle, and so forth. A second switch 240 controls which held voltage is used by current mirrors 226 and 228. The logic circuit 238 switches the oldest voltage being held by capacitors 232 and 234 to the current mirrors 226 and 228. Accordingly, when the RT/CLK terminal 216 changes states, the voltage controlling current mirrors 226 and 228 is the voltage sample from the clock cycle just prior to the state change, thereby ensuring stable mirrored currents.

Next, consider RT-MODE (internal clock signal, no external clock signal). When the synchronization circuit 200 is in RT-MODE, the RT/CLK terminal 216 is held to $V_{REF}$ by an amplifier 242. The resulting current through an external resistor 246 is provided by transistor 224, and as discussed above the current through transistor 224 is mirrored by transistors 226 and 228. When the MODE signal 218 indicates an RT-MODE, an electronic switch 248 connects the internal oscillator 204 to the current mirror 226. When the MODE signal 218 indicates an RT-MODE, an electronic switch 250 connects the slope compensation circuit to the current mirror 228. Accordingly, in RT-MODE, the current controlling the frequency of the internal oscillator 204, and the current 222 controlling the slope-compensation circuit, are linear functions of the current through the external resistor 246.

Next, consider a transition from RT-MODE (internal clock) to CLK-MODE (external clock). When an external clock signal 202 becomes present at the RT/CLK terminal 216, the first rising or falling edge of the external clock signal 202 will cause the MODE signal 218 to go to the CLK-MODE state. At that time, the logic circuit 238 halts sampling by switch 236, and keeps switch 240 connected to the oldest voltage being held by capacitors 232 and 234, so that the internal oscillator 204 continues to be operate at the pre-transition frequency until the transition state is verified. Also, the current output 222 to the slope-compensation circuit continues to be generated based on the sampled current until the transition state is verified. When the clock detect circuit 212 determines that an external clock signal 202 has been verified, the SYNC-ON signal 220 causes the logic circuit 238 to control the frequency-to-current circuit 214 to generate a current 252 that is dependent on the frequency of the external clock signal 202. The SYNC-ON signal 220 also causes the logic circuit 238 to switch the state of switch 250, so that the current 222 to the slope-compensation circuit is provided by the frequency-to-current circuit 214. The SYNC-ON signal 220 also causes the logic circuit 238 to switch the state of switch 248 so that the internal oscillator 204 is connected to the frequency-to-current converter 214, but the internal oscillator 204 is turned off to save power (this will be explained further in the discussion of a transition from CLK-MODE to RT-MODE). The SYNC-ON signal 220 also causes the multiplexer 206 to switch the output clock signal 208 from the output of the internal oscillator 204 to the external clock signal 202.

Next, consider a transition from CLK-MODE (external clock) to RT-MODE (internal clock). During CLK-MODE, the internal oscillator 204 is turned off. A voltage on a line 254 controls a current output signal 252 from the frequency-to-current converter 214. During CLK-MODE, at each clock edge, a sample-and-hold circuit, comprising an electronic switch 256 and a capacitor 258, samples and holds the voltage on the line 254. Current mirrors 260 and 262 generate currents proportional to the sampled voltage from the line 254. When the external clock 202 is lost at the RT/CLK terminal 216, the transition is detected by the mode detect circuitry 218, which switches the MODE signal 218 to RT-MODE. When the MODE signal 218 switches from CLK-MODE to RT-MODE, the sample and hold circuit (256, 258) stops sampling, the internal oscillator 204 is turned on, and the frequency of the internal oscillator 204 is set by the sampled current from current mirror 260 until the RT-MODE is verified. Likewise, when the MODE signal 218 switches from CLK-MODE to RT-MODE, the current 222 to the slope-compensation circuit continues to be controlled by the sampled current from current mirror 262 until the RT-MODE is verified. At the time the MODE signal 218 switches from CLK-MODE to RT-MODE, the MODE signal 218 overrides the SYNC-ON signal 220 so that the multiplexer 206 immediately switches to the internal oscillator 204. After a predetermined time to allow the amplifier 242 to settle, the logic circuit 238 causes the state of switch 248 to change so that the internal oscillator 204 is controlled by the current mirror 226, and the logic circuit 238 causes the state of switch 250 to change so that current 222 to the slope-compensation circuit is controlled by the current mirror 228.

Figure 3:
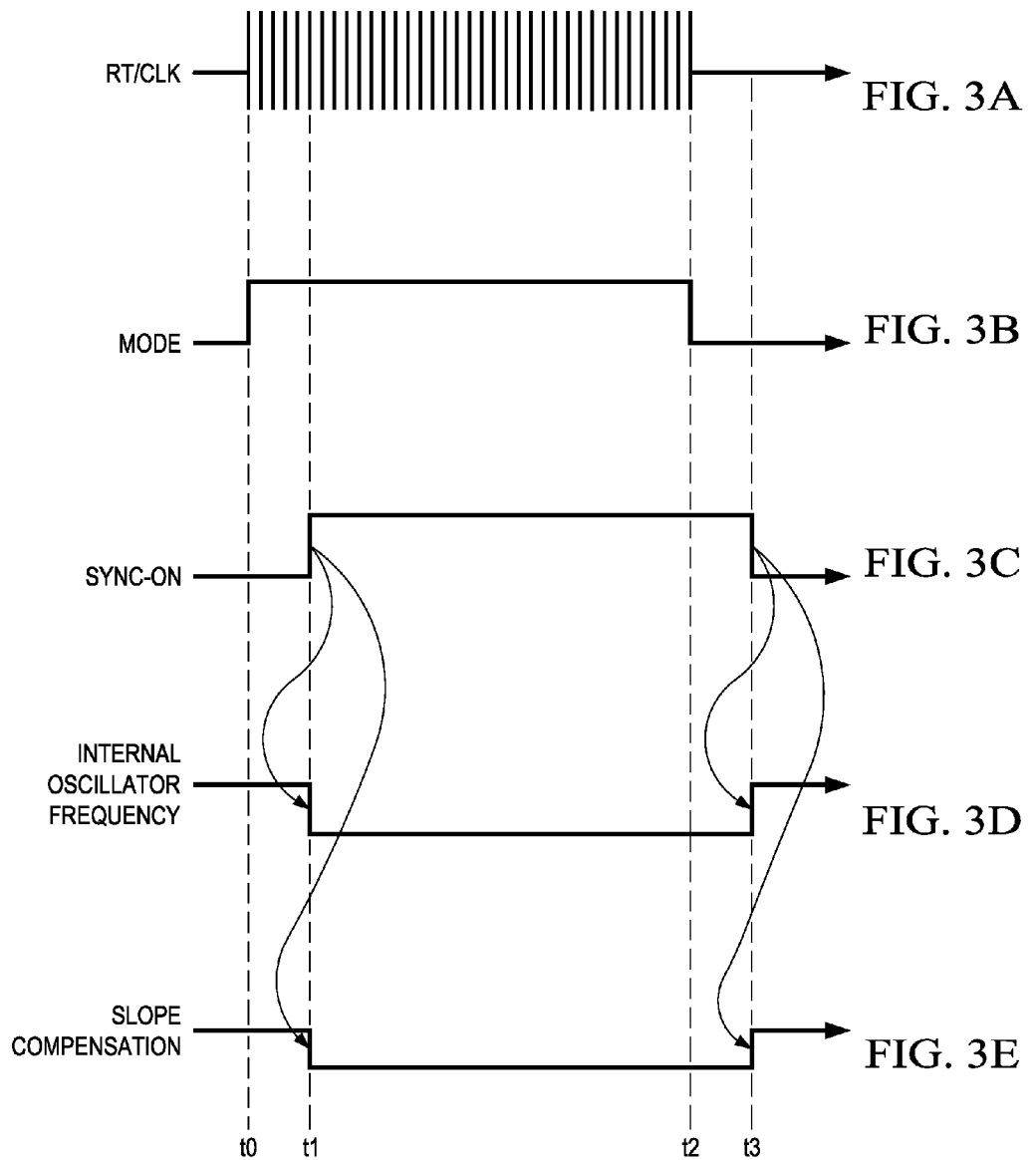
FIGS. 3A-3E are timing diagrams illustrating example waveforms for various signals in the example synchronization circuit of FIG. 2.

When the external clock 202 is lost, it takes a finite amount of time for amplifier 242 to pull the RT/CLK node 216 high to switch to RT-MODE. To make this transition faster, the example of FIG. 3 includes a pull-up current source 264 and an amplifier 266. A reference voltage V2 is less than $V_{REF}$. The current source 264 and amplifier 266 force the RT/CLK node 216 to V2 when the RT/CLK node is not being driven high by amplifier 242. This ensures that when the external clock 202 is lost then there is enough current to quickly pull up the RT/CLK node 216. When the RT/CLK node 216 is forced higher than V2 by amplifier 242 then the pull-up current 264 is cut off by amplifier 266.

FIGS. 3A-3E illustrate timing for example waveforms for various signals in the example synchronization circuit of FIG. 2. First, consider time t0. In FIG. 3A, the signal at the RT/CLK terminal (216) changes from a DC voltage determined by an external resistor (246) to an external clock signal (202). In FIG. 3B, the MODE signal (218) changes state when the state of the RT/CLK terminal (216) changes. In FIG. 3D, the signal (output of 248) controlling the frequency of the internal oscillator (204) is sampled and remains constant. In FIG. 3E, the signal (222) controlling slope compensation is sampled and remains constant.

Now consider time t1. In FIG. 3C, the SYNC-ON signal (220) indicates a valid clock input signal (202). In FIG. 3D, the signal (output of 248) controlling the frequency of the internal oscillator (204) changes to a value determined by the frequency of the external clock signal (202), but the internal oscillator (204) is turned off. In FIG. 3E, the signal (222) controlling slope compensation changes to a value determined by the frequency of the external clock signal (202).

Now consider time t2. In FIG. 3A, the clock signal at the RT/CLK terminal (216) is lost and the voltage at the RT/CLK terminal (216) returns to a DC voltage determined by an external resistor (246). The rate at which the voltage at the RT/CLK terminal (216) changes at time t2 is boosted by a pull-up current (264). In FIG. 3B, the MODE signal (218) changes state when the state of the RT/CLK terminal (216) changes. In FIG. 3D, the signal (output of 248) controlling the frequency of the internal oscillator is sampled and remains constant, the internal oscillator (204) is turned on, and the internal oscillator frequency is the same as the frequency of the external clock signal (202) just before the external clock signal (202) was lost. In FIG. 3E, the signal (222) controlling slope compensation is sampled and remains constant.

Now consider time t3. In FIG. 3C, the SYNC-ON signal (220) indicates a valid loss of the clock input signal (202). In FIG. 3D, the signal (output of 248) controlling the frequency of the internal oscillator changes to a value determined by the current through the external resistor (246). In FIG. 3E, the signal (222) controlling slope compensation changes to a value determined by the current through the external resistor (246).

Figure 4:
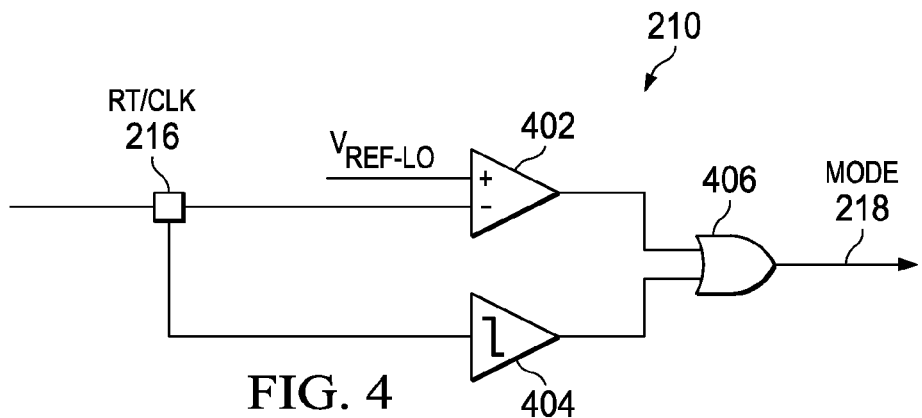
FIG. 4 is a block diagram illustrating example additional detail for part of the synchronization circuit of FIG. 2.

FIG. 4 illustrates additional detail for an example embodiment of the mode detection circuit 210. In the example of FIG. 4, the mode detection circuit 210 comprises a comparator 402, a Schmidt Trigger 404, and a logical OR gate 406. The comparator 402 determines whether the voltage at the RT/CLK terminal 216 is greater than a reference voltage $V_{REF}$-LO, which is lower than $V_{REF}$. Note, the voltage V2 in FIG. 2 is between $V_{REF}$-LO and $V_{REF}$. The Schmidt Trigger 404 determines whether the voltage at the RT/CLK terminal 216 exceeds a logic level. If either condition is present, the OR gate 406 drives the MODE signal 218 to CLK-MODE. If neither condition is present, the OR gate 406 drives the MODE signal 218 to RT-MODE.

Figure 5:
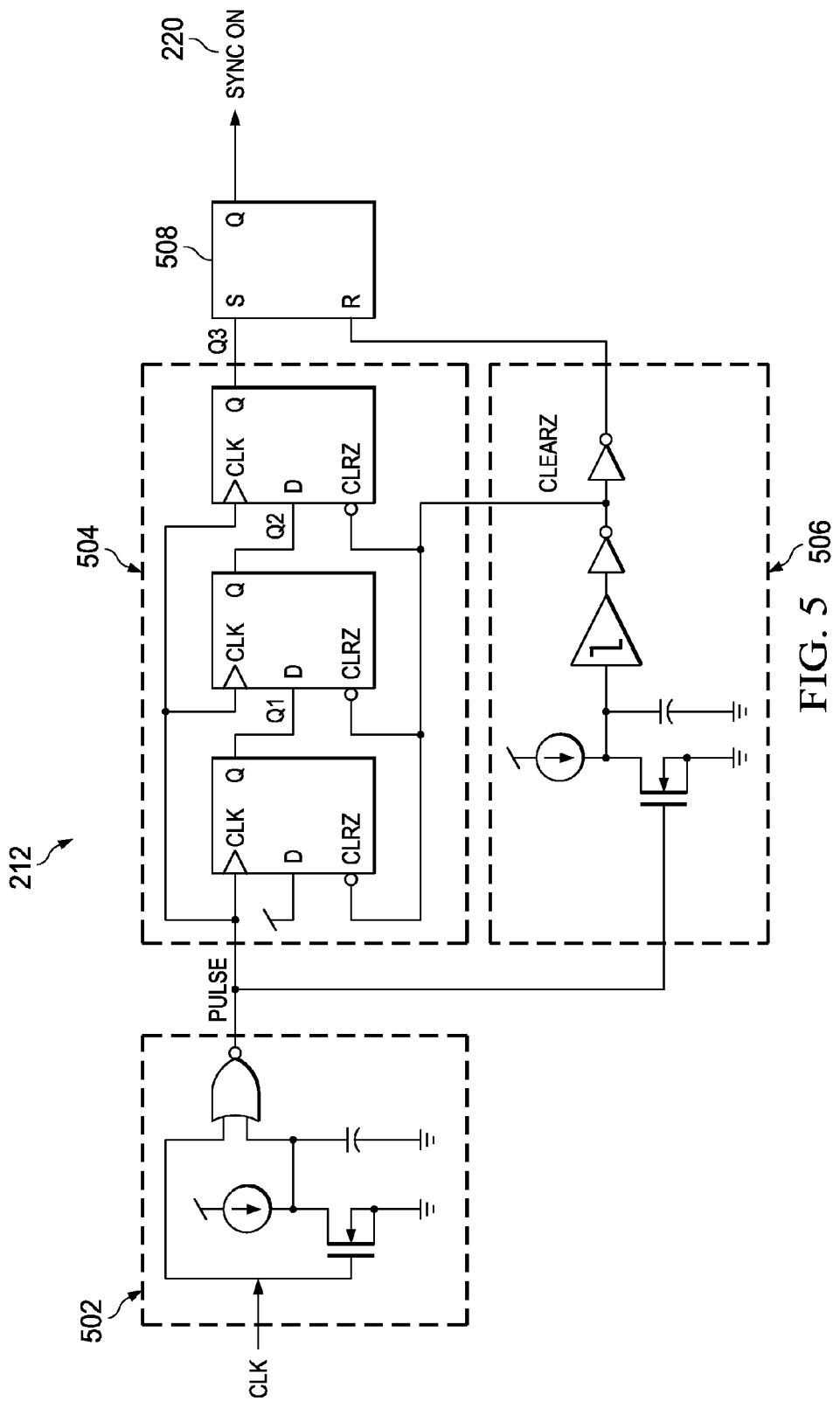
FIG. 5 is a block diagram illustrating example additional detail for part of the synchronization circuit of FIG. 2.

FIG. 5 illustrates additional detail for an example embodiment of the clock detection circuit 212. In the example of FIG. 5, the clock detection circuit 212 comprises a pulse generator 502 that generates a pulse at every rising edge of the input clock signal 202. A three-stage counter 504 counts the pulses. A timer circuit 506 ensures that the clock frequency is higher than a predetermined frequency. Stated alternatively, the timer circuit 506 ensures a minimum time between every two consecutive pulses. If the time between two pulses is longer than the predetermined time, then a signal CLEARZ resets the count and resets the output SYNC-ON signal 220. When four pulses are counted by the counter 504, a latch 508 initiates the SYNC-ON signal 220. Note that a count of four is just an example for purposes of illustration and other counts may be appropriate.

Figure 6:
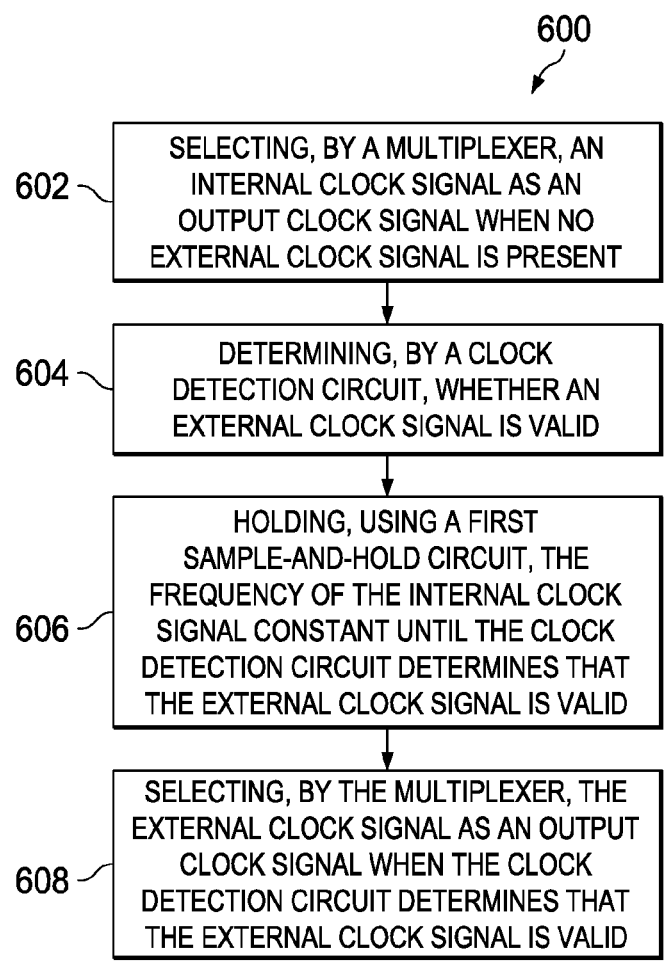
FIG. 6 is a flow chart illustrating an example embodiment of a method for controlling a synchronization circuit.

FIG. 6 illustrates an example embodiment of a method 600 for controlling a synchronization circuit. Note that ordering of the steps for illustration does not imply a required order and that some steps may occur simultaneously. At step 602, a multiplexer selects an internal clock signal as an output when no external clock is present. At step 604, a clock detection circuit determines whether an external clock signal is present. At step 606, a first sample-and-hold circuit holds the frequency of the internal clock signal constant until the clock detection circuit determines that the external clock signal is valid. At step 608, the multiplexer selects the external clock signal as an output when the clock detection circuit determines that the external clock signal is valid.

The example embodiments illustrated in FIGS. 2-6 provide a synchronization circuit that has lower cost, a smaller die area, and a wider clock frequency range compared to a prior art synchronization circuit based on a PLL. In particular, the embodiments of FIGS. 2-6 can synchronize over a much wider frequency range than a PLL, and increasing the frequency range does not impact the die area as much as increasing the frequency range of a PLL. Unlike a PLL, the embodiments of FIGS. 2-6 can instantly jump from any frequency to any frequency after a transition is verified. The embodiments of FIGS. 2-6 include slope compensation, and therefore they are particularly useful for peak-current-mode control where slope compensation is needed, but the synchronization part of the circuitry is useful for any switching regulator whether slope compensation is needed or not. In addition, the example embodiments of FIGS. 2-6 provide three features that provide substantial immunity to noise at the RT/CLK terminal and substantially reduced perturbations due to mode changes. First, alternate sampling of the gate voltage 230 reduces the effects of noise on the current mirrors 226 and 228. Second, when switching from RT-MODE to CLK-MODE, holding the voltage to the current-mirrors 226 and 228, and delaying switching to the frequency-to-current converter 214, until the mode change is verified, reduces the impact of a noise-induced mode state change. Third, when switching from CLK-MODE to RT-MODE, sampling-and-holding a voltage from the frequency-to-current converter 214, and delaying when control is switched to current mirrors 226 and 228 until the mode change is verified, reduces the impact of a noise-induced mode state change.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A synchronization circuit having an output, the synchronization circuit comprising:
    an external clock input;
    an internal oscillator;
    a clock detection circuit, coupled to the external clock input, determining whether a clock signal at the external clock input is valid;
    circuitry keeping the frequency of the internal oscillator constant until the clock detection circuit determines that an external clock signal is valid; and
    circuitry switching the output of the synchronization circuit from the internal oscillator to the external clock input when the clock detection circuit determines than an external clock signal is valid.

2. The synchronization circuit of claim 1, the internal oscillator being controlled by a first mirror of a current through an external resistor when no external clock signal is present.

3. The synchronization circuit of claim 2, further comprising:
    a first sample-and-hold circuit keeping the first mirror constant when an external clock signal first becomes present at the external clock input.

4. The synchronization circuit of claim 3, where a voltage controlling the first mirror is sampled on alternate clock edges, and where the oldest sample is used to control the first mirror.

5. The synchronization circuit of claim 2, further comprising:
    a slope compensation current signal for controlling a slope compensation circuit.

6. The synchronization circuit of claim 5, the slope compensation current signal being controlled by a second mirror of the current through the external resistor when no external clock signal is present.

7. The synchronization circuit of claim 6, further comprising:
    a second sample-and-hold circuit keeping the second mirror constant when an external clock signal initially becomes present at the external clock input.

8. The synchronization circuit of claim 7, where a voltage controlling the second mirror is sampled on alternate clock edges, and where the oldest sample is used to control the second mirror.

9. The synchronization circuit of claim 6, further comprising:
    a frequency-to-current converter having an input coupled to the external clock input, where the slope compensation current signal is generated by the frequency-to-current converter when an external clock signal is present at the external clock input.

10. The synchronization circuit of claim 9, further comprising:
    a third sample-and-hold circuit, sampling a voltage at an output of the frequency-to-current converter, keeping the slope compensation current constant when an external clock signal is initially lost at the external clock input.

11. The synchronization circuit of claim 2, further comprising:
    circuitry accelerating the rate-of-change of the voltage at the external resistor when the external clock signal is initially lost.

12. The synchronization circuit of claim 1, the clock detection circuit further comprising:
    a timer, timing a time between two consecutive edges of the clock signal, the clock detection circuit indicating an invalid clock signal when the time between two consecutive edges is longer than a predetermined time.

13. A method for controlling a synchronization circuit, comprising:
    selecting, by a multiplexer, an internal clock signal as an output clock signal when no external clock signal is present;
    determining, by a clock detection circuit, whether an external clock signal is valid;
    holding, using a first sample-and-hold circuit, the frequency of the internal clock signal constant until the clock detection circuit determines that the external clock signal is valid; and
    selecting, by the multiplexer, the external clock signal as an output clock signal when the clock detection circuit determines that the external clock signal is valid.

14. The method of claim 13, further comprising:
    determining, by the clock detection circuit, that an external clock signal is not valid when the time between two consecutive edges of the external clock signal is longer than a predetermined time.

15. The method of claim 14, further comprising:
    double sampling, by the first sample-and-hold circuit, a voltage for controlling the frequency of the internal clock; and
    using, by the first sample-and hold circuit, the oldest sample to control the internal clock.

16. The method of claim 13, further comprising:
    generating, by a frequency-to-current converter, a current signal, based on the frequency of the external clock signal.

17. The method of claim 16, further comprising:
    mirroring, by a current mirror, the current generated by the frequency-to-current converter, to generate a signal for slope compensation.

18. The method of claim 17, further comprising:
    holding, using a second sample-and-hold circuit, the slope compensation current constant until the clock detection circuit determines that the external clock signal is valid.

19. The method of claim 17, further comprising:
    holding, using a third sample-and-hold circuit, the slope compensation current constant when the external clock signal is initially lost.

20. The method of claim 13, further comprising:
    accelerating, using a current source, the rate of change of a voltage used to control the frequency of the internal clock, when the external clock signal is initially lost.

* * * * *